Jan. 3, 1928. 1,654,669
J. R. TERRES ET AL
APPARATUS FOR MAKING TILE AND OTHER PLASTIC PRODUCTS
Filed Oct. 25, 1926 4 Sheets-Sheet 1
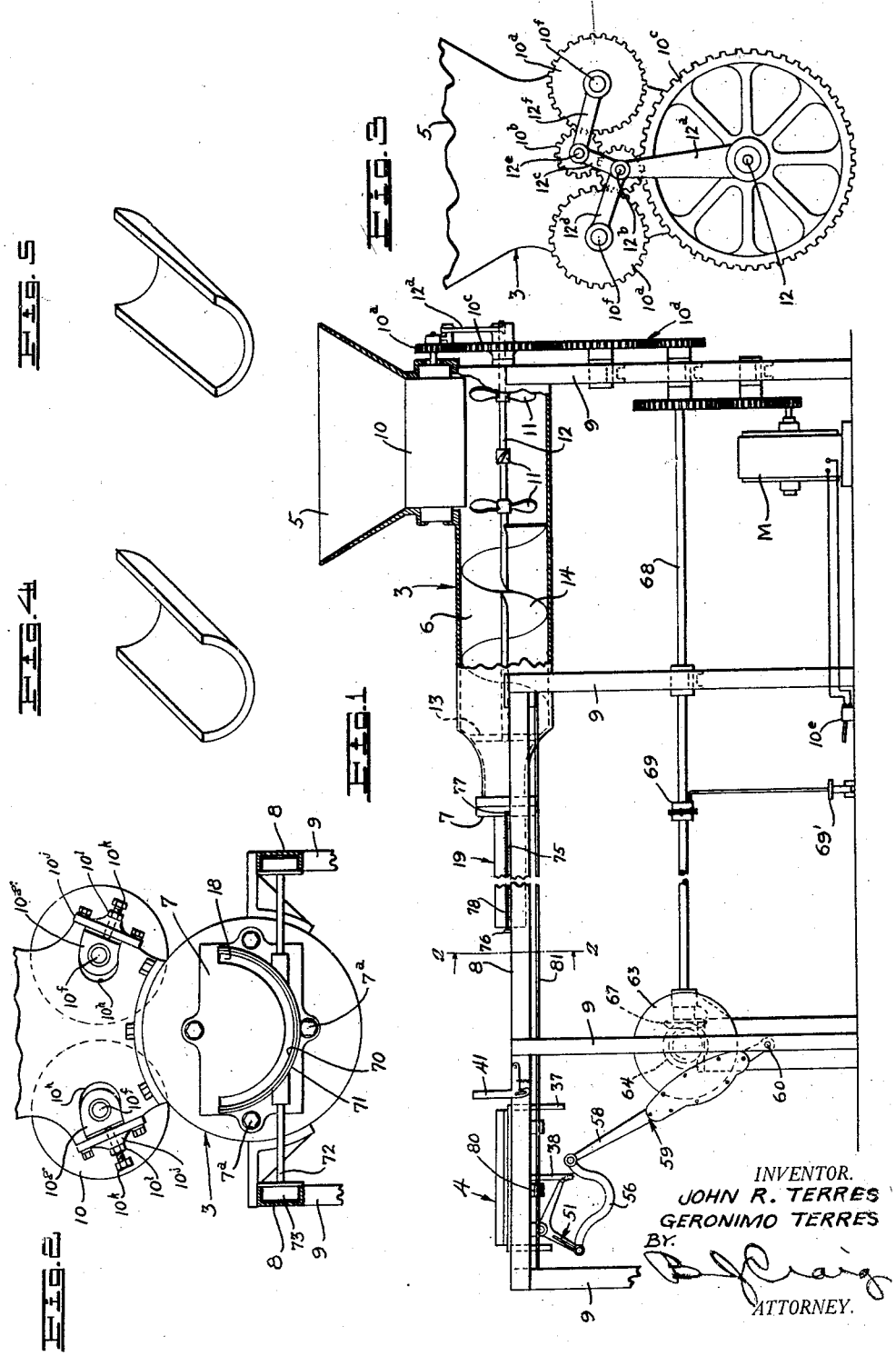
INVENTOR.
JOHN R. TERRES
GERONIMO TERRES
BY
ATTORNEY.

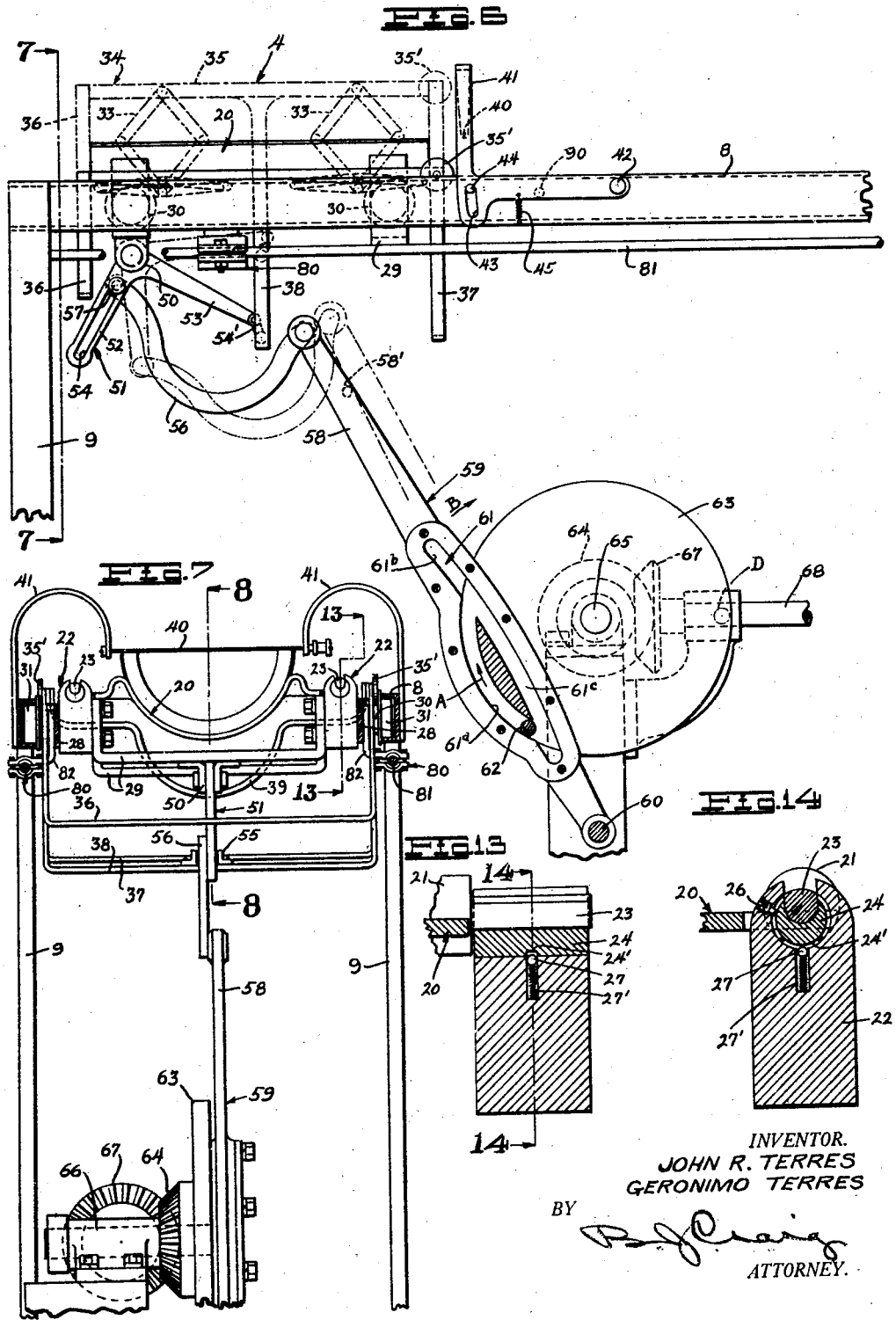

Jan. 3, 1928.
J. R. TERRES ET AL
1,654,669
APPARATUS FOR MAKING TILE AND OTHER PLASTIC PRODUCTS
Filed Oct. 25, 1926
4 Sheets-Sheet 3
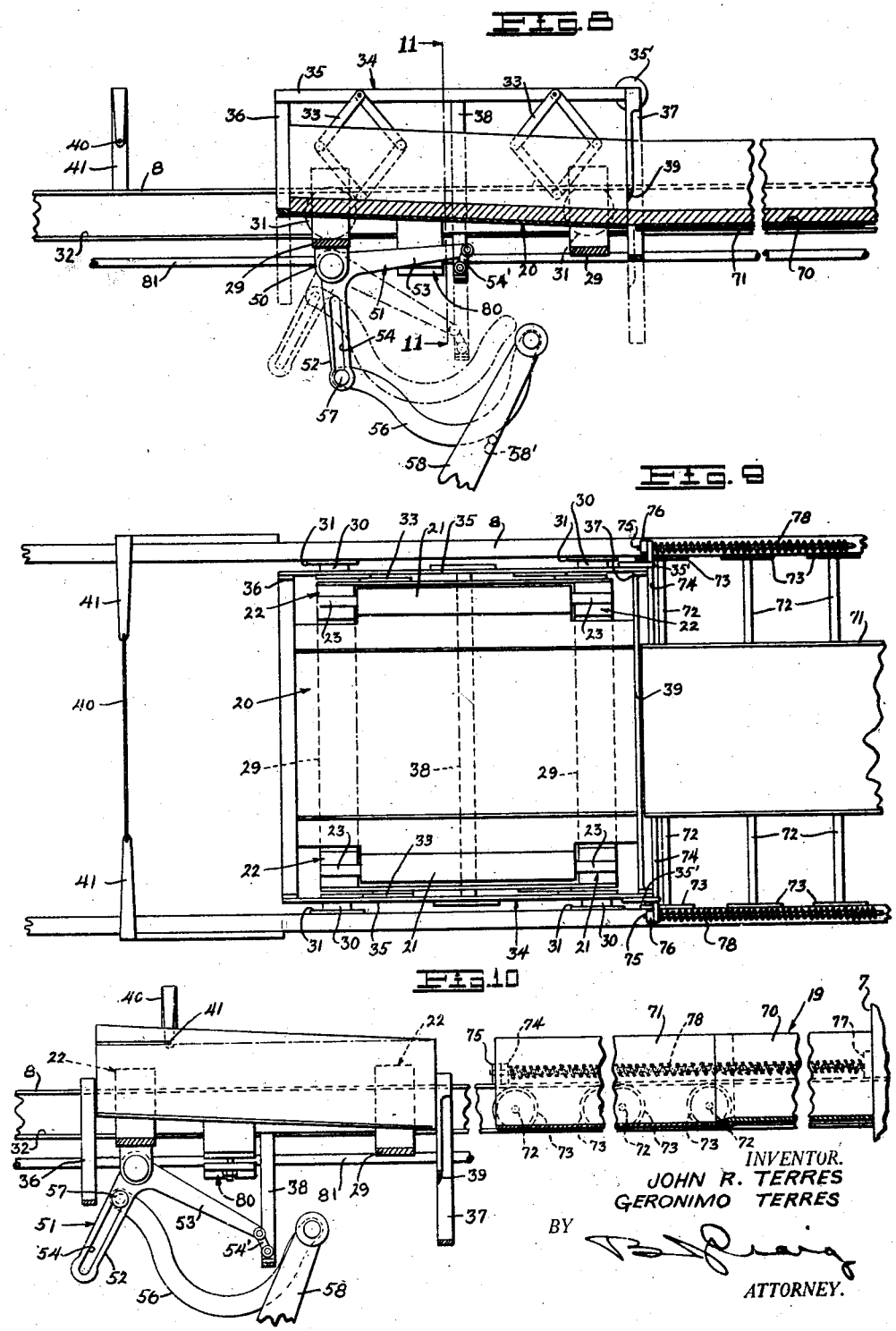
INVENTOR.
JOHN R. TERRES
GERONIMO TERRES
BY
ATTORNEY.

Jan. 3, 1928.
J. R. TERRES ET AL
1,654,669
APPARATUS FOR MAKING TILE AND OTHER PLASTIC PRODUCTS
Filed Oct. 25, 1926     4 Sheets-Sheet 4
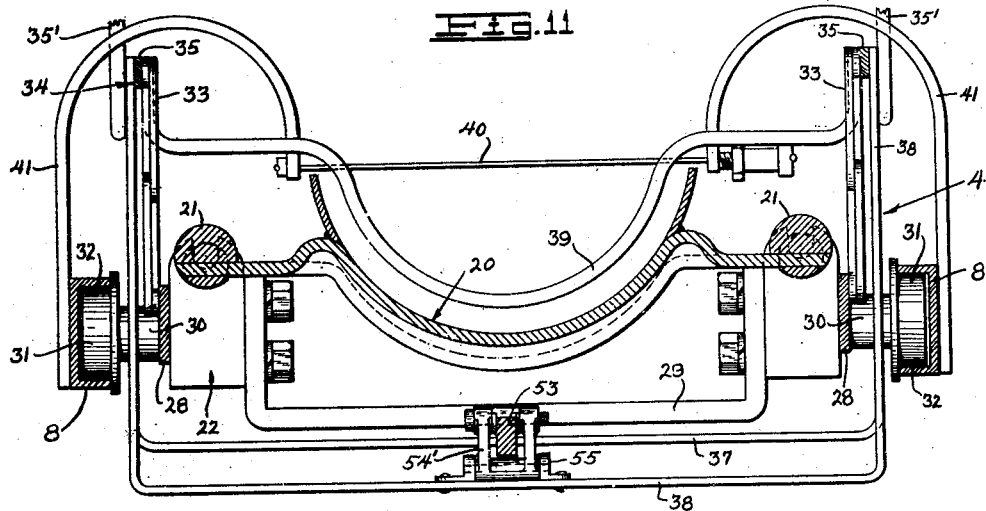
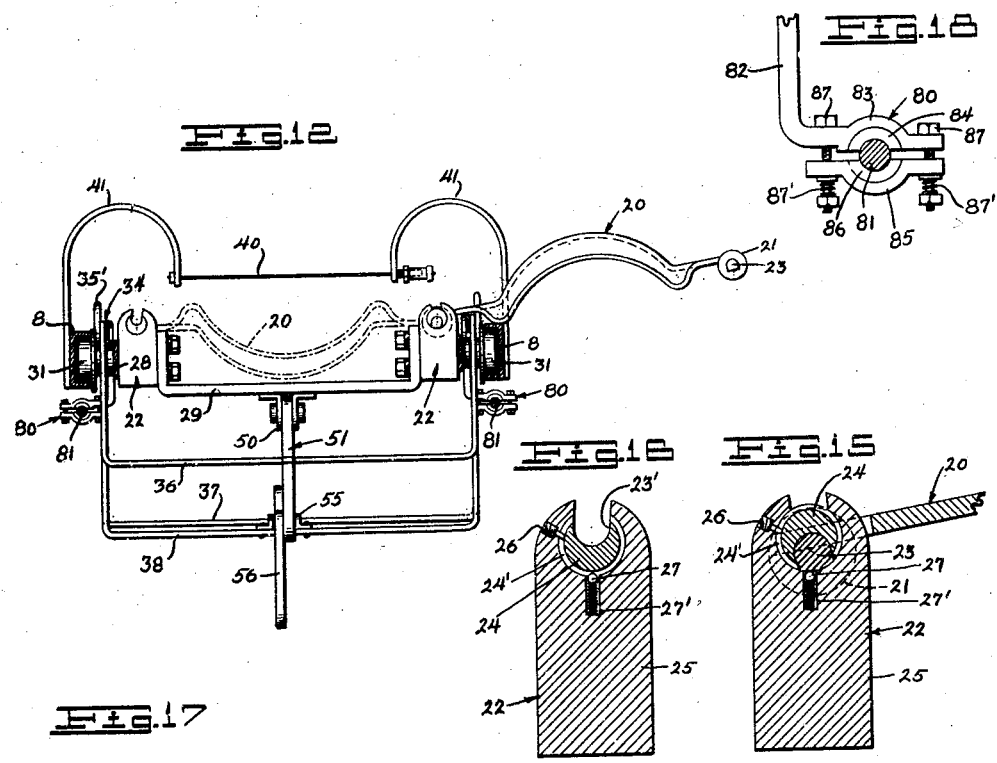
INVENTORS.
JOHN R. TERRES
GERONIMO TERRES
BY
ATTORNEY.

Patented Jan. 3, 1928.

1,654,669

UNITED STATES PATENT OFFICE.

JOHN R. TERRES AND GERONIMO TERRES, OF SANTA BARBARA, CALIFORNIA.

APPARATUS FOR MAKING TILE AND OTHER PLASTIC PRODUCTS.

Application filed October 25, 1926. Serial No. 143,811.

This invention relates to apparatus for making articles from plastic material.

The general object of our invention is to provide an automatic machine for making tile.

Another object of our invention is to automatically make shaped tile.

Still another object of our invention is to provide means for cutting the tile to wedge-shaped form.

Other objects of the invention will be apparent from the following description taken in connection with the accompanying drawings, wherein:

Fig. 1 is a side elevation partially in section showing one type of our complete tile making machine;

Fig. 2 is a section taken on line 2—2 of Fig. 1 showing a face view of the die member;

Fig. 3 is a fragmentary view of the hopper and mixer showing the relation of the gears for driving the crusher and mixer;

Fig. 4 is a perspective view of a tile as it emerges from the die member;

Fig. 5 is a perspective view of a tile in the finished form;

Fig. 6 is an enlarged side elevation of the discharge end of the machine showing the conveyor and the trimming knife and the lever and cam mechanism for operating the knife;

Fig. 7 is a section taken on line 7—7 of Fig. 6.

Fig. 8 is a section of the conveying mechanism taken on line 8—8 of Fig. 7 showing the conveyor at the loading end;

Fig. 9 is a top plan view of the same;

Fig. 10 is a sectional view of the conveyor showing the trimming wire shaving a pair of wedge shaped portions from the tile;

Fig. 11 is a section through the conveyor taken on line 11—11 of Fig. 8;

Fig. 12 is a section similar to Fig. 7 showing the method of ejecting the tile from the tile tray;

Fig. 13 is a section through one of the hinge members taken on line 13—13 of Fig. 7;

Fig. 14 is a section of the same taken on line 14—14 of Fig. 13;

Fig. 15 is a section showing the hinge bolt in the position it assumes when the tile tray is swung outward as shown in Fig. 12;

Fig. 16 is a section showing the tile tray supporting means removed from the hinge;

Fig. 17 is a side elevation of the trimming wire arms in a position to allow the tile to pass completely under the trimming wire, and Fig. 18 is a sectional detail.

As shown in the drawings our invention consists of a mixing apparatus 3 and a cutting and conveying mechanism 4. The mixing apparatus 3 consists of a feed hopper 5, a mixing and conveying chamber 6 and a die member 7, the whole being shown as mounted on a pair of U-shaped rails 8 which are in turn supported by a plurality of standards 9.

Our invention is particularly adapted for making articles such as tile from clay but may be used for making other articles from other materials, and although in the following description we refer to the manufacture of clay tile we do not wish to be limited to this specific use.

In the hopper 5, and adjacent the chamber 6, we provide a plurality of mixing blades 11 of propeller form mounted on a shaft 12 which is supported at one end by a bearing in the rear wall of the chamber and at the forward end by a bearing in a spider 13. Also mounted on the shaft 12 we provide a feed spiral 14 which extends from just forward of the mixing blades 11 to a point adjacent the rear of the die member 7. The rollers 10 have gears $10^a$ on their shafts and these gears $10^a$ are driven by gears $10^b$. The gears $10^b$ mesh with each other and the lower gear $10^b$ is driven by a gear $10^c$ which is on the shaft 12. The gear $10^c$ is driven by a train of gears $10^d$ by a motor M which may be controlled by a fast switch $10^e$.

The rollers 10 are mounted on shafts $10^f$ which are mounted in bearings $10^g$ and the bearings are mounted in radial slots $10^h$ at the outer ends of which are provided caps $10^j$ provided with set screws $10^k$ and lock nuts $10^l$.

When it is desirous to diminish the space between the rollers 10 the lock nuts $10^l$ are backed up and the set screws $10^k$ are turned to travel inwardly, thus forcing the bearing $10^g$ inwardly, and as the bearings support the shafts $10^f$ on which are mounted the rollers 10, the rollers will be moved towards each other. To allow for this inward and outward movement of the rollers it is necessary to mount the gearing in a novel way, consisting of loosely mounting on the shaft 12 one end of a link $12^a$, the other end of which serves as a bearing in which is mounted a stud 12$^b$ for supporting the lower gear 10$^b$. Loosely mounted on the shaft 12$^b$ are two more links 12$^c$ and 12$^d$, the link 12$^d$ has its other end loosely mounted on the shaft 10$^f$, while the link 12$^c$ has its other end loosely mounted on a stud 12$^e$ which supports the upper gear 10$^b$. The shaft 12$^e$ has loosely mounted on it another link 12$^f$ which has its other end loosely mounted on the shaft 10$^f$. With this arrangement of links it will be seen that the various gears are always kept in their various relative operative positions.

As the material is fed into the hopper 5 it passes downwardly between the rollers 10 and emerges therefrom in the form of a thin sheet and as this sheet continues to pass downwardly it is cut up and mixed by the blades 11 from whence it is picked up by the spiral 14 and conveyed forward to the die member 7 and forced through a U-shaped orifice 18 formed therein. The die member 7 is removable being held in place by bolts 7$^a$. The clay as it emerges from the orifice 18 is solidly packed and of the form shown in Fig. 4 of the drawings, and in this form it is ejected onto a loading platform 19 from whence it is picked up and cut to length by the mechanism 4.

The cutting and conveying mechanism 4 consists of a tile tray 20 which aligns with the loading platform 19 and is mounted in bars 21 (see Fig. 11), which are supported in a pair of longitudinally extending spaced hinge members 22. The hinge members 22 are held together by a frame consisting of a pair of spaced side bars 28 each of which engages a pair of hinge members.

It is desirous to be able to swing the tile tray 20 outward to either side and to do this we have provided a novel type of hinge 22. As previously set forth the tray 20 is mounted in the bars 21 and these bars have their ends reduced to form projections 23. These projections are each mounted in a recess 23' in a trunnion bearing 24. Each trunnion is mounted to turn in a hole in a hinge member 22. To prevent any lateral movement of the trunnion 24 a set screw 26 is provided in the member 22. The set screw 26 has a reduced end portion which engages a peripheral groove 24' formed in the trunnion 24. To steady the trunnion 24 and prevent chattering we provide a spring-pressed ball 27 located in a recess 27' in the hinge member 22 and working in the groove 24' of the trunnion bearing 24. The recess 23' in the bearing 24 is substantially the width of the projection 23.

The hinge members 22 are so constructed as to allow the tile tray 20 to be swung outward to either one side or the other. When the tray 20 is swung outward to the position shown in Fig. 12 the right hand set of hinges act as the pivot and the projection 23 of the hinge supporting bar 21 is removed from the recess 23' of the left hand hinge member as shown in Fig. 16, while the bar 23 of the right hand hinge member rotates the bar 24 which allows the pivotal action as shown in Fig. 15.

The side bars are connected by stirrup-like cross bars 29. Mounted on the outer side of each of the bars 28 adjacent the hinge members 22 are a pair of spaced bearings 30 for supporting wheels 31 which are mounted to roll in the U-shaped recess 32 of the rails 8. Mounted on each of the bars 28 are two sets of lazy tongs 33. These serve to support a frame 34 which is adapted to be moved up and down by the lazy tongs and consists of spaced horizontal bars 35, to each of which one pair of the lazy tongs is secured. The frame also includes downwardly extending transversely arranged U-shaped end bars 36 and 37. Intermediate the length of the bars 35 and secured thereto we show another downwardly extending transversely arranged U-shaped bar 38 to which part of the oscillating and reciprocating mechanism to be presently described is attached. Secured to the U-shaped bar 37 of the frame 34 is provided a length cutting knife 39. At the juncture of the bar 37 and the bar 35 at each side of the frame 34 I provide a roller 35', the function of which will be later explained.

In order that an entirely satisfactory tile may be produced, it is necessary to taper the tile. The tray 20 is tilted from its rear edge upwardly to its front edge. For trimming the tile to the wedge shape as shown in Fig. 5 of the drawings I provide a cutting wire 40 securely held in spaced arms 41. The arms 41 are each composed of a lower portion which is pivotally secured to a rail 8 at 42, and an upper portion which is arched inwardly and to which the wire 40 is secured. Movement of the arms 41 about the pivots 42 is limited by a slot 43, in the arms, in which a stop pin 44 on the frame fits. For retaining the arms 41 in operative trimming position a coil spring 45 engages each arm and the adjacent rail to pull the arms down.

In order to move the tray, the underside of the forward transverse bar 29 of the carriage is provided with a downwardly extending bearing 50 for pivotally supporting a bell crank arm 51. This crank arm is composed of two portions 52 and 53, the portion 52 is provided with an elongated slot 54. The portion 53 of the crank has pivotal engagement with a shackle 54' which is pivotally mounted in bearings 55 on the transverse portion of the bar 38. The portion 52 of the crank 51 is held in pivotal engagement with one end of a link 56 by means of a pin 57 which works in the slot 54, previously mentioned. The other end of the link 56 is pivotally secured to an arm 58 of a cam-operated oscillating member 59. The member 59 is pivotally mounted on a shaft 60 and is provided intermediate its length with a cam slot 61 for the reception of a cam member shown as a pin 62 which is mounted on a disk 63.

The disk 63 has a bevel gear 64 secured upon its rear face and is mounted on a shaft 65 which is supported in a bearing 66. For imparting rotation to the disk, there is provided a bevel gear 67 in mesh with the bevel gear 64, and secured to a shaft 68 which may be driven by a suitable source of power. It is shown in the drawings as driven by the motor M. The shaft 68 has a clutch 69 thereon which may be operated by a foot pedal 69' to control rotation of the disk 63. Adjacent the free end of the arm 58 is shown a pin 58' for causing the link 56 to start upward on a slight return movement of the arm 58.

The operation of the cutting and conveying mechanism is as follows, presuming the mechanism to be in the position shown in Figs. 1 and 6 of the drawings. The motor M is started and by means of the gears 64 and 67 and the disk 63 the pin 62 will travel in the track 61ª in the direction of the arrow "A" in Fig. 6, and will impart no movement to the arm 58 until it reaches the track 61ᵈ and travels upwardly therein, whereupon it will commence to move the arm 58 rearwardly in the direction of the arrow "B". As the arm 58 moves in this direction it will carry the link 56 with it and the link 56 will cause the crank arm 51 by means of the shackle 54' to raise the frame 34 and the latter will assume the dotted line position indicated in Fig. 6. On a further movement of the arm 58 the conveying mechanism 4 will be moved towards the die 7 and as the rollers 35' come in contact with the arms 41 they will be forced upwardly thereby raising the trimming wire out of the way of the length cutting knife 39. The rollers 35' when in a raised position as shown by the dotted lines in Fig. 6, are adapted to contact with the under surface of the top curved portion of the arms 41. Each roller 35' contacts with the curved portion of an arm 41 between the top of the arc of the curve and the long straight vertical portion of the arm. When the pin 62 reaches its uppermost position it starts downwardly in the track 61ᵇ and moves until it reaches the position shown in dotted lines and indicated by "D" in Fig. 6. From this position it continues to travel downwardly in track 61ᶜ and in so doing forces the arm 58 forwardly again until it again reaches the track 61ª.

The loading tray 19 consists of two parts, each being approximately the length of a finished tile. These parts include a stationary tray 70 and a movable tray 71 in telescoping engagement with the outside of the stationary tray. The movable tray 71 is provided with a plurality of shafts 72 having on their outer ends roller wheels 73 rotatably mounted in the U-shaped recesses 32 of the rails 8 for supporting the tray 71. Secured adjacent the front of the tray 71 and protruding outwardly therefrom and above the side rails 8 are arms 74 which loosely engage a rod 75 and are slidable therealong. The rods 75 are mounted in bearings 77 on the side rails 8 and each has disposed around it a coil spring 78, one end of which abuts the rod bearing 77 and the other arm 74 of the tray 71 and tends to keep the tray in a forward position as shown in Fig. 10.

As the conveying mechanism 4 is moved rearwardly, as previously described, the stirrup-shaped arm 37 of the conveying mechanism abuts the arms 74 of the movable tray and forces the same rearwardly against the action of the springs 78 as shown in Fig. 9. As the tray 71 is forced rearwardly by the conveying mechanism the U-shaped mass of clay on the stationary tray 70 and movable tray 71 is forced upon the tile tray 20 until the conveying mechanism has reached its most rearward position as shown in Fig. 8.

As the arm 58 starts forward again the pin 58' starts the link 56 upwardly, and as the link 56 moves upward and forward it causes the crank arm 51 to force the frame 34 downwardly. When the frame 34 travels down it carries with it the cutting knife 39 which passes through the clay and severs the clay on the tray 20 from that on the loading tray 70 and thus the clay is cut to tile length. As the tray 20 and the tray 70 do not abut there is enough clearance between them to allow the cutting knife 39 to pass downwardly therebetween.

The conveying mechanism continues to travel forward, the movable loading tray 70 being forced into its forwardmost position again by the coil springs 78 as shown in Fig. 10. The conveying mechanism passes under the trimming wire 40 and this wire engages the upper front edges of the raw tile and severs from each edge a wedge-shaped piece as shown in full and dotted lines in Fig. 10. When the conveying mechanism has reached the discharge end of the machine as shown in Fig. 6 it stops for a period of time corresponding to the length of time it takes the pin 62 to travel the length of the cam track 61ª. While the conveyor is in this position the operator grasps the side of the tile tray 20 farthest from him with one hand and pulls it towards him and into the position shown in Fig. 12 while with the other hand he removes the formed tile after which he swings the tile tray back to its normal position. After the pin 62 has traveled the length of the slot 61ª the arm 58 will start rearwardly and raise the frame 35 and cutting the wire 40 as previously described. As the conveying mechanism is moved rearwardly towards the die member 7 to be reloaded the rollers 35' will contact with the arms 41 and raise the trimming wire up out of the way of the length cutting knife 39 and allow the passage of the same rearwardly under the trimming wire.

As the weight of the frame 34 in some cases may be insufficient to prevent reciprocating action before some horizontal action of the conveying mechanism takes place, the conveying mechanism is supplied with friction means which clamps the horizontal movement. This friction means as shown, consists of mounting on the side frame bars 28 of the conveying mechanism a split bearing 80 in horizontal reciprocatable engagement with a rod 81 which is secured to and supported by the legs 9. The bearing 80 consists of a portion 82 secured to the side bars 28 of the conveying mechanism, a bushing holding portion 83 provided with a hemispherical bushing 84 which fits over the rod 81, and a cap member 85 also provided with a similar bushing 86. The cap member 85 is secured to the member 83 with bolts 87 on which springs 87' are arranged by which the frictional engagement of the two bushings 84 and 86 with the shaft 81 may be adjusted.

At times it may be desirous to form tile with this machine which do not require to be tapered and for this purpose there is provided adjacent the top of the side rails 8 intermediate the pivotal point 42 and the pin 44 of the arms 41, a hole 90 into which a pin 91 may be fitted after raising the arms 41 above the hole 90. When the arms are in the position shown in Fig. 17 the trimming wire 40 is raised sufficiently to allow the conveying mechanism with a tile disposed in the tray 20 to pass therebeneath without coming in contact with the same.

What we claim is:

1. In a tile making machine, a tray, and means to hinge said tray for swinging movement, said means including spaced hinged members, trunnions mounted in said hinged members, and projections on the tray fitting said trunnions.

2. In a tile making machine, a support, a tray on said support, and means to hinge said tray for swinging movement to either side of said support.

3. In a tile making machine, a hinged tray, means to feed a raw tile to said tray, a cutting member and means to advance said tray against the cutting member to remove a portion of the raw tile.

4. In a tile making machine, a shaping die, a tray movable to a position to receive a raw tile from the shaping die, and means to hinge said tray for swinging movement, said means including a pair of spaced hinge members, rotatable trunnions mounted on said hinge members, said trunnions being apertured to receive projections on the tray and means to prevent movement of the trunnions relative to the hinge member.

5. In a tile making machine, a shaping die, means to extrude clay through said die, a frame, means on said frame for receiving formed clay, a fixed cutting knife positioned adjacent to said clay and means to move said knife and said clay relative to each other to thereby cut off a wedge-shaped piece of clay from each side of said clay.

6. In a tile making machine, a shaping die, means to extrude clay through said die, a tray adjacent said die to receive the formed clay, said tray comprising a movable member and a fixed member, said movable member being movable to a telescoped position beneath said fixed member, a movable frame, a tray arranged on said frame, and means to move said frame towards and from said fixed member.

7. In a tile forming machine, a hopper, a track, a frame mounted to roll along said track said frame having lazy tongs thereon, a cutting knife supported by said tongs, means to impart downward movement to said cutting knife, a shaving knife arranged in the path of movement of said tray when the tray moves in one direction, means to lift the knife out of the path of movement when the tray moves in another direction, and a continuously operated mechanism for reciprocating said tray and for raising or lowering said cutting knife.

8. In a tile making machine, a horizontally movable frame, an inclined tray arranged on said frame said tray being adapted to receive formed clay, a length cutting member adjacent said frame, means to operate said length cutting member to sever a raw tile from the formed clay, a cutting knife positioned above said inclined tray, means to move said tray with the formed clay thereon to bring the clay against said knife to thereby cut off a wedge-shaped piece of clay from each side of said tile means to support said tray on said frame, said means comprising hinged members arranged on each side of the frame and means connecting said frame with each of said hinged members so that the frame may be swung to either side.

9. In a tile making machine, a shaping die, means to extrude clay through said die, a movable frame, an inclined tray arranged on said frame, a length cutting member adjacent said frame, means to operate said length cutting member to sever a tile from formed clay, a cutting knife positioned above said tilting tray, means to move said tray with the formed clay thereon to bring the clay against said knife to thereby cut off a wedge-shaped piece of clay from each side of said tile, means to support said tray on said frame said means comprising a hinged member arranged on one side of the frame.

10. In a tile making machine, a shaping die, means to extrude clay through said die, a tray adjacent said die to receive the formed clay, said tray comprising a movable member and a fixed member, said movable member being movable to a telescoped position beneath said fixed member, a movable frame, said frame being movable horizontally, an inclined tray, means to support said tray on said frame, a length cutting member adjacent said frame, means to operate said length cutting member to sever a tile from the formed clay, a cutting knife positioned above said inclined tray, means to move said inclined tray with the raw tile thereon to bring the clay against said knife to thereby cut off a wedge-shaped piece of clay from each side of said tile, said tray supporting means comprising a hinged member arranged on each side of the frame and means connecting said frame with each of said hinged members so that the frame may be swung to either side.

11. In a tile forming machine, a die, means for forcing clay through the die, a movable tray, a cutting knife movable towards and from said tray, a fixed shaving knife in the path of movement of said tray to engage an article on the tray when the tray moves in one direction, and means to move said tray and to raise said cutting knife.

12. In a tile forming machine, a tray associated with said die, a horizontal track, a frame mounted to roll along said track, an inclined tray on said frame, said frame having lazy tongs thereon, a cutting knife supported by said lazy tongs a shaving knife pivoted on said track in the path of movement of said inclined tray to engage an article on the tray when the tray moves in one direction, and means to reciprocate said inclined tray and to raise said lazy tongs, said means including a bell crank pivoted to said frame.

13. In a tile forming machine, a tray associated with said die, a horizontal track, a frame mounted to roll along said track, an inclined tray on said track, said frame having lazy tongs thereon, a cutting knife supported by said lazy tongs, a shaving knife adjacent to said track in the path of movement of said inclined tray to engage an article on the tray when the tray moves in one direction, and means to reciprocate said inclined tray and to raise said lazy tongs, said means including a bell crank pivoted to said frame, an arm, a curved link pivoted on said arm and engaging said crank and means to move said arm.

14. In a tile forming machine, a horizontal track, a frame mounted to roll along said track, an inclined tray on said frame, said frame having lazy tongs thereon, a cutting knife supported by said lazy tongs, a shaving knife pivoted on said track in the path of movement of said inclined tray to engage an article on the tray when the tray moves in one direction, means on the tray for lifting the knife out of the path of movement when the tray moves in a reverse direction and means to reciprocate said inclined tray and to raise said lazy tongs, said means including a bell crank pivoted to said frame, one arm of said bell crank having a slot therein, a pin movable in said slot, an arm, a curved link pivoted on said arm and engaging said pin, said arm having a cam slot therein, a disk adjacent said arm and a pin on said disk fitting said cam slot.

15. In a tile forming machine, a movable and a fixed tray, said movable tray being mounted for telescopic movement with relation to said fixed tray, a horizontal track, a frame mounted to roll along said track an inclined tray on said track, said frame having lazy tongs thereon, a cutting knife supported by said lazy tongs, a shaving knife pivoted on said track in the path of movement of said inclined tray to engage an article on the tray when the tray moves in one direction, means on the inclined tray for lifting the knife out of the path of movement when the inclined tray moves in a reverse direction and means to reciprocate said inclined tray and to raise said lazy tongs, said last mentioned means including a bell crank pivoted to said frame, one arm of said bell crank having a slot therein, a pin movable in said slot, an arm, a curved link pivoted on said arm and engaging said pin, said arm having a cam slot therein, a disk adjacent said arm, a pin on said disk fitting said cam slot, and means to rotate said disk.

16. In a tile making machine, means to form clay into semi-cylindrical shape, means to advance the formed clay, means to cut the shape into lengths, means to lift one end of each length and means to remove part of the upper edge of each of the lifted lengths.

17. In a tile making machine, a support for raw tile, means to feed raw tile to said support, a fixed cutting member in the path of movement of the tile and means to cause movement of the tile to remove a portion of the tile.

18. In a tile making machine, a tray, means to advance a raw tile to said tray, a cutting member above the tray, means to lift the tray and means to advance said tray against the cutting member to remove a portion of each edge of the raw tile.

19. In a tile forming machine, automatic means for extruding clay to a formed shape, a tray for receiving the formed clay, means to move the formed clay, means on the tray for cutting the clay into lengths and means mounted independent of the tray for removing a wedge-shaped portion from each length.

20. In a tile making machine, a track, a frame including a tile receiving tray mounted to reciprocate on said track, means to feed formed clay to said tray and means on the tray for cutting off said clay to predetermined lengths.

21. In a tile making machine, a die, means to extrude clay from said die, a length cutting knife mounted to move vertically, means to advance the formed clay beneath said knife and automatic means to cause said knife to cut a length from said formed clay, a stationary cutting member and means to advance one end of said length against said stationary cutting member.

22. In a tile making machine, a die, a tray, means to extrude clay from said die onto said tray, a vertically movable length cutting knife movable on said tray, means to advance the formed clay beneath said knife and automatic means to cause said knife to cut a length from the formed clay on said tray.

23. In a tile making machine, a length cutting knife, means to advance formed clay to said knife, means to cause said knife to cut a length from the formed clay, and means to thereafter cut a strip of clay from each edge of the formed clay.

24. In a clay making machine, a track, a frame mounted to reciprocate in said track, means to reciprocate said frame, means to feed formed clay to said frame, means for cutting off a piece of clay to a predetermined length at each reciprocation and means for shaving off a part of one edge of each formed length.

25. In a tile forming machine, automatic means for extruding clay to a formed shape, automatic means for advancing the clay so formed, means for cutting the extruded clay into lengths and stationary means for removing a portion of each of the cut off lengths.

In testimony whereof, we hereunto affix our signatures.

JOHN R. TERRES.
GERONIMO TERRES.